June 2, 1942.  F. W. KNOTT ET AL  2,285,163
FUEL PUMP
Filed Feb. 26, 1940  2 Sheets-Sheet 2
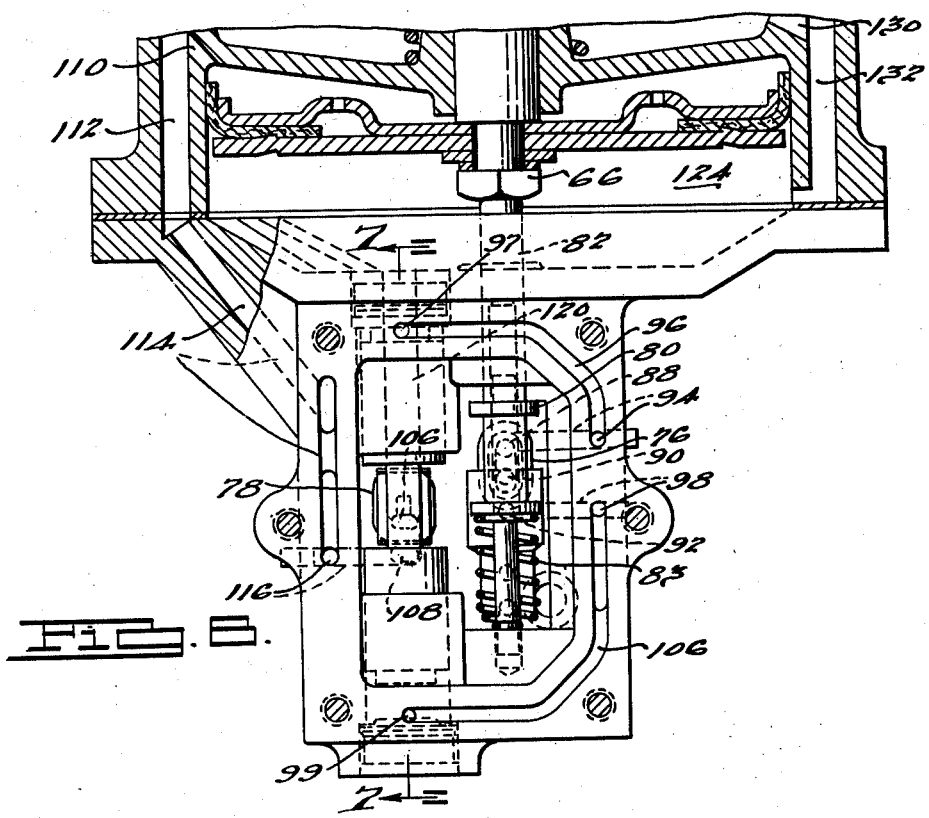
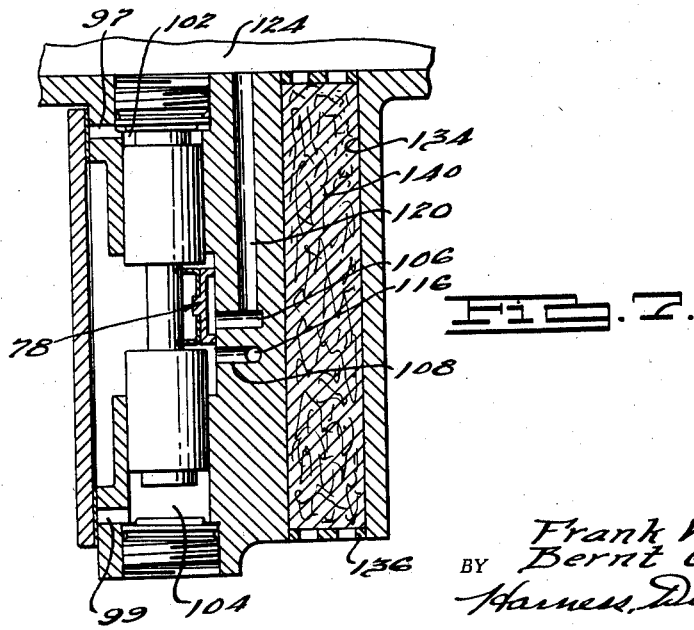
INVENTORS.
Frank W. Knott,
BY Bernt Garllus.
Harness, Dickey & Pierce
ATTORNEYS.

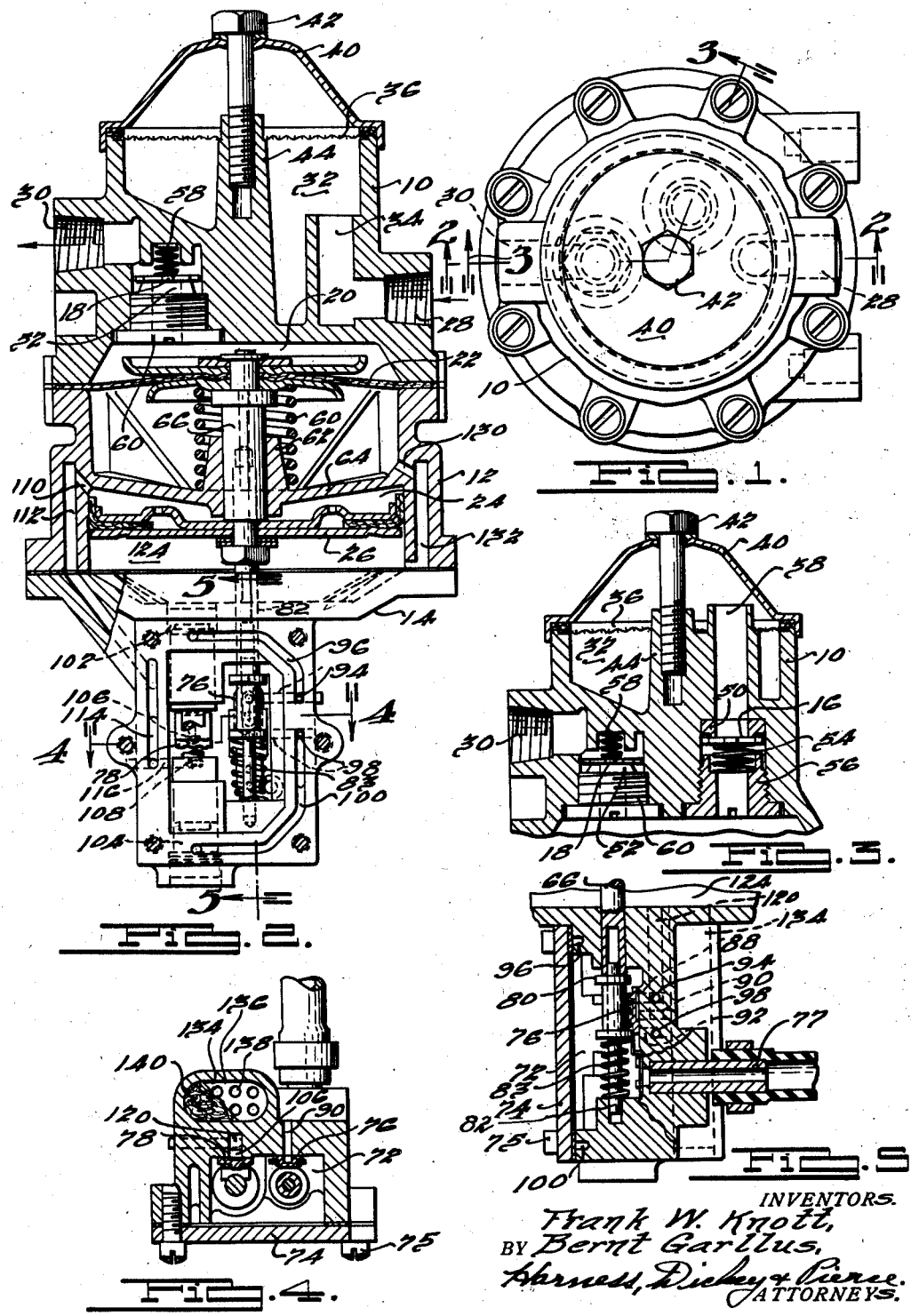

Patented June 2, 1942

2,285,163

UNITED STATES PATENT OFFICE 2,285,163

FUEL PUMP

Frank W. Knott and Bernt Garllus, Detroit, Mich.

Application February 26, 1940, Serial No. 320,761

3 Claims. (Cl. 103—152)

The present invention relates to pumping devices, and is particularly directed to the provision of an improved fuel pump for automotive vehicles.

The copending application of the present applicants, Serial No. 263,723, filed March 23, 1939, and now abandoned, discloses and claims certain aspects of a vehicle accessory system comprising generally an engine driven compressor, adapted to supply air or other compressible fluid at a substantially uniform pressure independently of variations in the operating speed of the engine, to various vehicle accessories, such, for example, as a windshield wiper and a fuel pump. The fuel pump of the present application embodies improvements in construction and arrangement over the fuel pump disclosed and claimed in said copending and now abandoned application and although, in a generic sense, the present construction is susceptible of a general application, it is preferred to utilize the present fuel pump in an accessory system of the type disclosed in the copending application.

The principal objects of the present invention are to provide a device for pumping fuel or other liquids, which is economical of manufacture and assembly, and which is efficient and reliable in operation; to provide such a structure having a pumping diaphragm or equivalent element, which is adapted to be moved through one stroke by means of a spring or equivalent element and is adapted to be moved through the opposite stroke by means of an air operated piston or equivalent element, the whole being characterized as embodying improved means for venting the areas behind the diaphragm and the piston; to provide such structures having interconnected chamber spaces behind the diaphragm and the piston, respectively, which chamber spaces are vented to atmosphere through an improved breather arrangement; and to provide such structures in which the just-mentioned breather connection also affords an exhaust connection for the chamber space at the operating side of the operating piston.

Further objects of the invention are to provide a structure of the above generally indicated class, in which the sediment chamber or equivalent space is integrally built into the pump housing; to provide such structures wherein the pump housing is formed to define a sediment or equivalent chamber and which is positioned above the level of the fuel chamber at the active side of the diaphragm; to provide such structures wherein the inlet and outlet check valves associated with the fuel chamber are so positioned relative to the sediment chamber as to virtually eliminate the possibility of allowing the valves to go dry; and to generally improve the construction and arrangement of fuel feeding devices.

With the above as well as other objects in view, which appear in the following description and in the appended claims, a preferred but illustrative embodiment of the invention is shown in the accompanying drawings, throughout the several views of which corresponding reference characters are used to designate like parts, and in which:

Figure 1 is a view in top plan of an embodiment of the invention;

Fig. 2 is a view in vertical transverse section, taken along the line 2—2 of Fig. 1;

Fig. 3 is a view in vertical transverse section, taken along the line 3—3 of Fig. 1;

Fig. 4 is a view in horizontal section, taken along the line 4—4 of Fig. 2;

Fig. 5 is a view in vertical section, taken along the line 5—5 of Fig. 2;

Fig. 6 is a view showing, on an enlarged scale, the motor valve mechanism of Fig. 2; and Fig. 7 is a fragmentary view in vertical section, taken along the line 7—7 of Fig. 6.

Referring particularly to Figs. 1 through 5, the fuel pump comprises a housing which is built in three separable sections 10, 12, and 14. The upper section 10 defines the hereinafter described sediment chamber and also houses the inlet and outlet check valves 16 and 18. The underside of the section is recessed to define a fuel chamber 20, the lower end whereof is closed by a flexible diaphragm element 22. Diaphragm element 22 is secured in place between the lower marginal edge of the upper housing section 10 and the intermediate housing section 12.

The intermediate housing section 12 is formed to define a piston chamber 24, which slidably receives the piston 26. The lower housing section 14 is secured to the underside of the intermediate housing section 12, and serves to house the hereinafter described reversing valve mechanism.

The upper housing section 10 is of generally cylindrical form, and is provided at one side with the usual inlet 28 which may be connected to the source of fuel supply (not shown), and is provided at the other side with a suitable outlet 30, to which may be connected the line leading to the carburetor or other device with which the pump is associated. The interior of the housing section 10 is formed to define the generally circumferentially extending annular chamber 32, into which the fuel flows through the inlet 28 by way of the short standpipe portion 34. Fuel entering the chamber 32 is caused to flow upwardly through the strainer 36 or equivalent element, which is seated upon the upper marginal edge of the housing section 10, and is then enabled to flow downwardly through the standpipe 38, to the previously mentioned inlet check valve 16. The standpipe 38 rises to a point above the level of the strainer 36, so that the fuel must first pass through the strainer before entering the standpipe 38. As is evident, the space above the strainer 36 is closed by means of a removable cap 40, which is secured in place by means of a stud 42 which is threaded into a post 44, which extends upwardly into the chamber 32.

The valves 16 and 18 are illustrated as being of generally conventional disc-like construction, the valve 16 being adapted when in closed position, to seat against a valve seat 50, and the valve 18, when in closed position, being adapted to seat against a valve seat 52. A spring 54 bears against the valve 16 and urges it towards its seat. The spring 54 is retained in place by means of a nipple 56, which is threaded into the body of the housing portion 10. The valve 18 is provided with a similar spring 58, which urges it toward the closed position, the seat 52 being formed at the inner end of a removable nipple 60, which is threaded into the body of the housing portion 10.

With this relation, it will be noted that an upward or delivery movement of the diaphragm 22 enables the spring 54 to close the inlet valve 16, and also causes the outlet valve 18 to open. A downward or intake movement of the diaphragm 22, on the other hand, enables the valve 18 to be closed under the influence of the spring 58, and forces the inlet valve 16 to open against the force of its spring 54. A pulsating movement of the diaphragm 22 thus produces a flow of fuel from the inlet 28 to the outlet 30. It will be noted that by virtue of the relative positioning of the inlet and outlet valves 16 and 18 relative to the chamber 32, positioned thereabove, and also by virtue of the standpipe 38, any loss of fuel, while the pump is idle, either from the apparatus to which the outlet 30 is connected or from the fuel tank to which the inlet 28 is connected, does not serve to empty the fuel pump. For example, assuming a loss from the fuel tank by evaporation or otherwise, any return flow from the chamber 32 through the inlet 28 is not effective to lower the level of the liquid in the standpipe 38 associated with the inlet check valve 16. Similarly, a loss of fuel occasioned by leakage or evaporation or otherwise from the apparatus to which the outlet 30 is connected, serves only to lower the level of the fuel in the housing portion 10 to a position just above the level of the outlet check valve 18. Such loss is not effective to empty the standpipe 38, since the spring 54 is effective to hold valve 16 closed in opposition to the weight of the fuel in the standpipe. During idle periods, accordingly, the diaphragm chamber 20 and the area surrounding the valves 16 and 18 remain continuously filled with fuel, thus eliminating the otherwise existing occasional necessity for a priming action of the pump.

As will be evident from the drawings, the upward movements of the diaphragm are produced by the compression spring 60, one end whereof is seated against the underside of the diaphragm 22, the other end whereof is seated over a boss 62 formed at the center of a web 64, which web defines the upper end of the previously described piston chamber 24. The downward movements of the diaphragm 22 in turn are produced by applying air pressure to the chamber 24, so as to force the piston 26 downwardly. Accordingly, the diaphragm 22 and the piston 26 are rigidly interconnected to each other by means of the push rod 66, which is slidable through the bearing opening provided therefor in the boss 62. As described below, the chamber 24 is connected to air pressure at the end of each upper or delivery stroke of the diaphragm 22, and is vented to atmosphere at the conclusion of each downward or intake stroke of the diaphragm 22.

Referring now particularly to Figs. 2 and 4 through 7, the valve mechanism for alternately connecting the piston chamber 24 to atmosphere and to the source of operating pressure for the fuel pump comprises a relay valve 76 and a main valve 78, which valves are constructed and arranged in substantially the same manner as is disclosed in the above identified copending and now abandoned application, and both whereof are received in a valve chamber 72 which is recessed into the body of the lower housing portion 14. The otherwise open face of the chamber 72 is closed by a cover plate 74, which is secured in place relative to the housing portion 14 by a plurality of studs, such as 75, (Fig. 5). The chamber 72 is provided with an inlet connection 77 which, in the system of the above identified copending and now abandoned application, leads directly to the engine driven compressor. The interior of the chamber 72 may thus be regarded as continuously supplied with operating pressure of a predetermined value.

The relay valve 76 is adapted to be directly operated in accordance with the up and down movements of the diaphragm 22 and piston 26, by means of a yoke 80, which is fixed to a push rod 82. The upper end of the push rod 82 bears against the lower end of the push rod 66, so that each downward movement of the latter causes a downward movement of the push rod 82 and the yoke 80. A spring 83 surrounds the lower end of the push rod 82 and is seated between the yoke 80 and the housing portion 14. The spring 83 is thus effective to force the push rod 82 and the yoke 80 upwardly during and in accordance with each upward movement of the diaphragm 22 and the piston 26. The yoke 80 thus moves between upper and lower limits directly in accordance with the corresponding movements of the diaphragm 22 and the piston 26 between its upper and lower limits. The relay valve 76 is of shorter length than the yoke 80 and with this relation, it will be understood that the yoke 80 serves to move the valve 76 between its upper and lower positions as the respective limits of the yoke movement are approached.

The valve 76 cooperates with a series of three ports 88, 90 and 92, all whereof open through the seat provided for the valve 76 at the base of the valve chamber 72. The upper port 88 communicates, through connecting passages 94, 96 and 97, with the upper operating chamber 102 associated with the air operated valve 78. The lower port 92 communicates, through connecting passages 98, 100 and 99, with the lower operating chamber 104 associated with the air operated valve 78. The intermediate port 90 opens directly to atmosphere, as is most clearly shown in Fig. 4.

The parts are shown in the various figures with the diaphragm 22 and the piston 26 in their upper limit position, and consequently the yoke 80 is in its upper limit position. It will be understood that just prior to each arrival of the yoke 80 at its upper limit position, it engages the valve 76 and moves it to its illustrated upper position. In its illustrated upper position, the relay valve 76 covers the ports 88 and 90, thus connecting the chamber 102 associated with the air operated valve 78 to atmosphere through the exhaust port 90. In the upper position, also, the valve 76 exposes the lower port 92, so that the lower chamber 104 associated with the air operated valve 78 is connected to pressure through the passages 100, 98 and 92. Under these circumstances, the air operated valve 78 is held in its upper position, in the relation shown in the various figures.

The air operated valve 78 cooperates with a pair of ports 106 and 108. The lower port 108 leads directly to the piston chamber 24, through connecting passages 110, 112, 114 and 116. The upper port 106 in turn is connected to atmosphere through a fluid circuit described below, which includes the passage 120, which latter passage leads directly into the chamber space 124 beneath the piston 26. When the valve 78 is in its upper position, it covers the exhaust port 106, but exposes the lower port 108. With the port 108 exposed, pressure from the valve chamber 72 is admitted through the passages 116, 114, 112 and 110, directly to the chamber space above piston 24, which pressure is effective to force the piston 26 and the diaphragm 22 downwardly against the force of the pump spring 60, thereby effecting an intake stroke of the pump. During the course of the downward movement of the diaphragm 22 and the piston 26, the upper end of the yoke 80 engages the relay valve 76, and forces the latter downwardly to its lower limit position, which latter action occurs substantially simultaneously with the arrival of the diaphragm 22 and piston 26 at their lower limits of travel. The just-mentioned movement of the relay valve 76 causes it to expose the port 88 and to cover the ports 90 and 92. With the port 88 exposed, the chamber 102 associated with the upper end of the air operated valve 78 is connected to pressure, and the chamber 104 associated with the lower end of this valve is connected to atmosphere through the ports 100, 98, 92 and 90. Consequently, the air operated valve 78 moves to its lower position as an incident to the arrival of the pump at its lower limit. When in its lower limit position, the air operated valve 78 covers both of the ports 106 and 108 so that the chamber space above the piston 26 is vented to atmosphere through the passages 110, 112, 114, 116, 108, 106, and 120. As soon as pressure is relieved from the chamber 24, the pump spring 60 is effective to force the diaphragm 22 and the piston 26 upwardly. When the pump completes its upward stroke, the relay valve 76 is again moved to its upper position, in which it completes the fluid circuits which again move the air valve 76 to its upper position. The latter action initiates the intake stroke of the pump, as described above.

An important feature of the present invention resides in the provision of means for venting the chamber space beneath the diaphragm 22 and for also venting the chamber space beneath the piston 26. To accomplish this, these chamber spaces are interconnected by means of the passages 130 and 132 formed in the housing portion 12. In addition, the lower housing portion 14 is provided with an enlarged breather passage 134, which extends from the lower end thereof upwardly to and opens into the previously mentioned chamber space 124 beneath the piston 26. The lower end of the breather passage 134 is provided with a protective grille or other member illustrated as a stamping 136, having a plurality of perforations 138 therein. If desired and as illustrated, also, the breather passage 134 may be partially or entirely filled with a filter material, such as steel wool 140. With this relation, it will be understood that the areas beneath the diaphragm 22 and the piston 26 are continuously vented to atmosphere through the breather passage 134. As previously mentioned, also, the passage 120 which communicates with the exhaust port 106 associated with the air operated valve 78 also opens into the chamber 124, and this exhaust port 106 is, therefore, vented to atmosphere through the just-mentioned breather passage 134. This relationship of the parts is advantageous, in view of the fact that the breather passage may be arranged to have a silencing effect on any gas or air passed therethrough, and so serves to silence the hissing or other noise which would otherwise be incident to the venting of the pressure developed in the piston chamber 24 during each intake stroke of the pump.

Although only a single specific embodiment of the invention has been described in detail, it will be appreciated that various modifications of the form, number and arrangement of parts may be made without departing from the spirit and scope of the invention as defined in the appended claims.

What is claimed is:

1. In a fuel pump having a pumping chamber and pumping means associated therewith, a fluid operated movable element for actuating said pumping means, means for admitting air to one side of said element to actuate the same in one direction, spring means for actuating said element in the other direction, and means defining a fluid circuit common to both sides of said element for venting the same to atmosphere.

2. In a fuel pump having a pumping chamber and pumping means associated therewith, a fluid operated movable element for actuating said pumping means, means for admitting air to one side of said element to actuate the same in one direction, spring means for actuating said element in the other direction, means defining a fluid circuit common to both sides of said element for venting the same to atmosphere, and valve means interposed between the space at said one side of said element and said venting passage, the space at the other side of said element being continuously connected to said venting passage.

3. In a fuel pump, the combination of housing means defining a fuel chamber and an operating chamber, a first movable element positioned in said fuel chamber, a second movable element positioned in said operating chamber, means for admitting fuel to the chamber space at one side of said first element to be pumped thereby, means for admitting fluid to the chamber space at one side of said second element to operate the same in one direction, spring means for moving said second element in the other direction, means defining a common venting passage for venting to atmosphere the chamber spaces at the opposite sides of said first and second elements, and valve means actuated in accordance with the movements of said elements for periodically connecting the chamber space at said one side of said second element to said common venting passage.

FRANK W. KNOTT.
BERNT GARLLUS.